(12) United States Patent
Shibahara (10) Patent No.: US 12,210,975 B2
(45) Date of Patent: Jan. 28, 2025

(54) DATA ANALYSIS APPARATUS, DATA ANALYSIS METHOD, AND RECORDING MEDIUM

(71) Applicant: HITACHI, LTD., Tokyo (JP)

(72) Inventor: Takuma Shibahara, Tokyo (JP)

(73) Assignee: Hitachi, Ltd., Tokyo (JP)

(*) Notice: Subject to any disclaimer, the term of this patent is extended or adjusted under 35 U.S.C. 154(b) by 1206 days.

(21) Appl. No.: 15/906,807

(22) Filed: Feb. 27, 2018

(65) Prior Publication Data

US 2018/0307969 A1 Oct. 25, 2018

(30) Foreign Application Priority Data

Apr. 20, 2017 (JP) ................................. 2017-083608

(51) Int. Cl.
| | | |
|---|---|---|
| *G06N 3/084* | (2023.01) | |
| *G06F 17/16* | (2006.01) | |
| *G06F 18/243* | (2023.01) | |
| *G06N 3/045* | (2023.01) | |
| *G06N 3/08* | (2023.01) | |

(52) U.S. Cl.
CPC ............ *G06N 3/084* (2013.01); *G06F 17/16* (2013.01); *G06F 18/24317* (2023.01); *G06N 3/045* (2023.01); *G06N 3/08* (2013.01)

(58) Field of Classification Search
CPC ........ G06N 3/0454; G06N 3/08; G06N 3/084; G06N 3/045; G06F 17/16; G06F 18/24317; G06K 9/6281; G06K 9/66; G06V 30/194
See application file for complete search history.

(56) References Cited

U.S. PATENT DOCUMENTS

| | | | | |
|---|---|---|---|---|
| 5,390,284 A | * | 2/1995 | Ogata | ...................... G06N 3/08 706/25 |
| 10,832,128 B2 | * | 11/2020 | Sawada | .................... G06N 3/08 |

(Continued)

FOREIGN PATENT DOCUMENTS

WO WO 2014/105866 A1 7/2014

OTHER PUBLICATIONS

Tüske, Z., Tahir, M. A., Schlüter, R., & Ney, H. (Apr. 2015). Integrating Gaussian mixtures into deep neural networks: Softmax layer with hidden variables. In 2015 IEEE International Conference on Acoustics, Speech and Signal Processing (ICASSP) (pp. 4285-4289). IEEE. (Year: 2015).*

(Continued)

*Primary Examiner* — Randall K. Baldwin
(74) *Attorney, Agent, or Firm* — BAKER BOTTS L.L.P.

(57) ABSTRACT

A data analysis apparatus using a first neural network comprises: a setting unit configured to receive output data from the first input layer, set a weight of each layer in the first intermediate layer based on the output data and a second learning parameter, and output said weight to the first output layer; a weight processing unit included in the first output layer, the weight processing unit being configured to weight each output data with the weight of each layer of the first intermediate layer that was set by the setting unit; and a calculation unit included in the first output layer, the calculation unit being configured to calculate prediction data based on each output data that was weighted by the weight processing unit and a third learning parameter.

12 Claims, 7 Drawing Sheets

(56) References Cited

U.S. PATENT DOCUMENTS 11,094,029 B2 * 8/2021 Kalamkar ............ G06N 3/0445
2017/0147921 A1 * 5/2017 Kasahara ............ G06N 3/0445

OTHER PUBLICATIONS

Mendoza, H., Klein, A., Feurer, M., Springenberg, J. T., & Hutter, F. (Dec. 2016). Towards automatically-tuned neural networks. In Workshop on Automatic Machine Learning (pp. 58-65). PMLR. (Year: 2016).*
Wang, P., Cao, Y., Shen, C., Liu, L., & Shen, H. T. (2016). Temporal pyramid pooling-based convolutional neural network for action recognition. IEEE Transactions on Circuits and Systems for Video Technology, 27(12), 2613-2622. (Year: 2016).*
Yamashita, Kazuhiko, et al. "An efficient method to set RBF network parameters based on SOM training." 2010 10th IEEE International Conference on Computer and Information Technology. IEEE, 2010. (Year: 2010).*

* cited by examiner

DATA ANALYSIS APPARATUS, DATA ANALYSIS METHOD, AND RECORDING MEDIUM

CLAIM OF PRIORITY

The present application claims priority from Japanese patent application JP 2017-083608 filed on Apr. 20, 2017, the content of which is hereby incorporated by reference into this application.

BACKGROUND

The present invention relates to a data analysis apparatus that analyzes data, a data analysis method, and a recording medium. The perceptron is a known method to predict output data based on input data. In the perceptron, predicted values are output by calculation results of linear coupling between the input vector and weight vector. The neural network, also referred to as the multi-perceptron, is the technique introduced in 1980s to achieve the capability of solving the linear separation impossibility problem by stacking a plurality of perceptrons in multiple layers. The neural network that has incorporated new techniques such as the drop-out (see WO2014/105866, for example), which was introduced around 2012, is referred to as "deep learning." The drop-out is a technique to randomly drop a learning parameter from each layer of the neural network during training and conduct the learning from the lower layer to the upper layer.

In the machine learning field, "learning" is to calculate a learning parameter (weight vector in the perceptron, for example) so that an error between the predicated value obtained by the input vector and the actual value (true value) is minimized. After the learning process is complete, it is possible to calculate a new predicated value from data that was not used in the training (will be referred to as test data). In the neural network, an error between the predicated value of the test data and the true value tends to be larger, and this problem is referred to as overfitting. One of the causes of overfitting is that the learning of learning parameters in lower layers is not sufficiently conducted due to the multi-layer structure of the perceptron.

However, even with the dropout, overfitting still occurs in a neural network with approximately ten layers, and the problem of overfitting is not fundamentally solved.

SUMMARY

The present invention was made in view of the situations described above, and is aiming at suppressing overfitting of the neural network.

An aspect of the invention disclosed in this application is a data analysis apparatus using a first neural network that includes a first input layer, a first output layer, and a first intermediate layer having at least two layers between the first input layer and the first output layer, the first intermediate layer being configured to give data from a previous layer and a first learning parameter to a first activation function for calculation and output a calculation result to a subsequent layer, the data analysis apparatus comprising: a setting unit configured to receive output data from the first input layer, set a weight of each layer in the first intermediate layer based on the output data and a second learning parameter, and output said weight to the first output layer; a weight processing unit included in the first output layer, the weight processing unit being configured to weight each output data with the weight of each layer of the first intermediate layer that was set by the setting unit; and a calculation unit included in the first output layer, the calculation unit being configured to calculate prediction data based on each output data that was weighted by the weight processing unit and a third learning parameter.

With representative embodiments of the present invention, it is possible to suppress overfitting of a neural network. Other objects, configurations, and effects than those described above are clarified by the following description of an embodiment.

DETAILED DESCRIPTION OF THE EMBODIMENT

Embodiment 1

<Neural Network>

Figure 1:
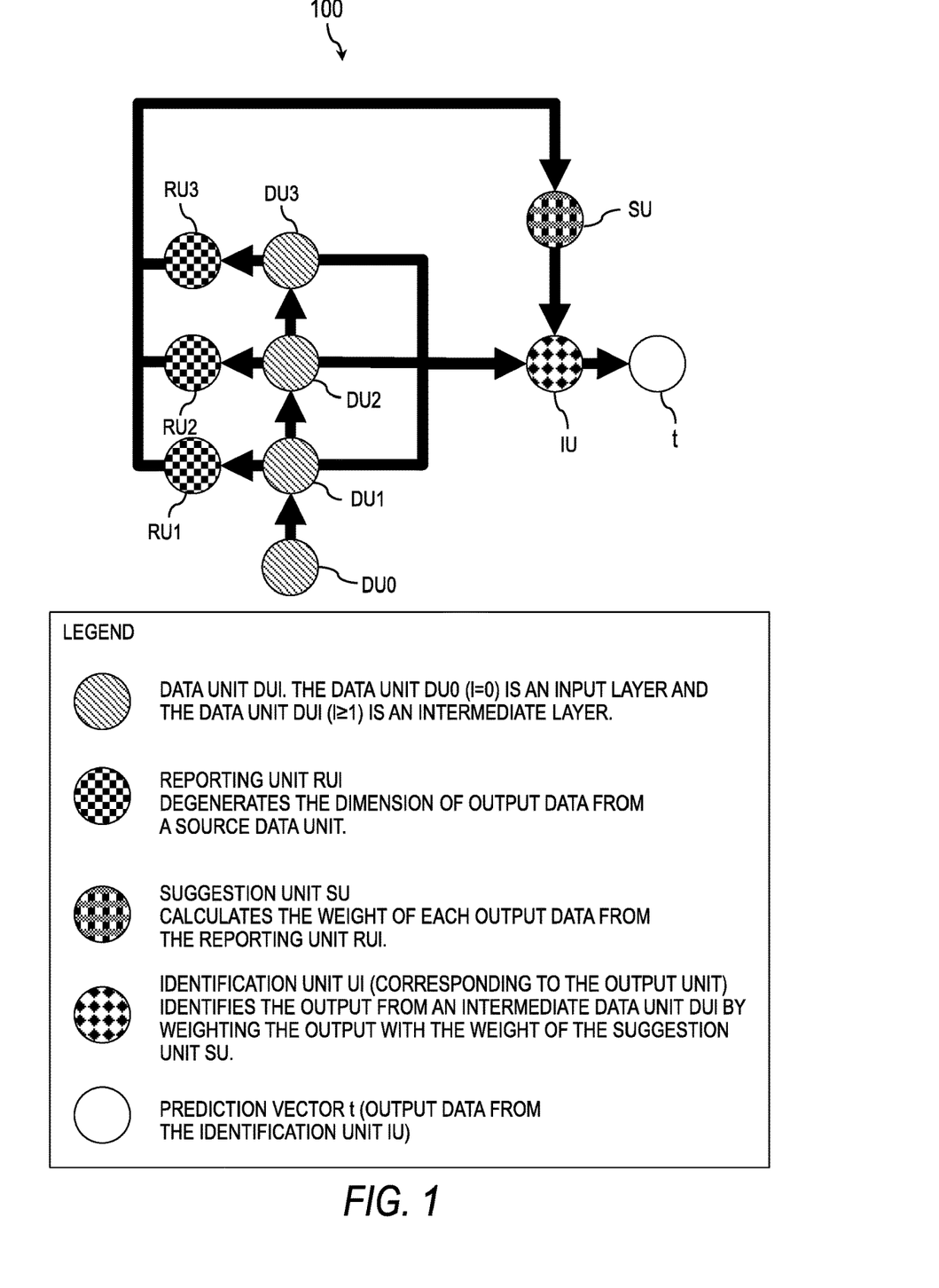
FIG. 1 is a diagram for explaining a configuration example of a neural network of Embodiment 1.

FIG. 1 is a diagram for explaining a configuration example of a neural network 100 of Embodiment 1. The neural network 100 includes a data unit group DU, a reporting unit group RU, a suggestion unit SU, and an identification unit IU. The data unit group DU has a configuration in which a plurality of data units DUl (1 is a level number, $0 \leq l \leq L$, is satisfied, L is the level number of the lowest layer, and in FIG. 1, L=3) are connected in series. The uppermost data unit DU0 (1=0) is the input layer of the neural network 100, and the data unit DUl ($l \geq 1$) corresponds to an intermediate layer (also referred to as a hidden layer) of the neural network 100. The data unit DUl is the perceptron that processes input data from the previous data unit DU (1−1) using the learning parameter of the data unit DUl, and outputs the resultant data.

However, the data unit DU0, which is the input layer, does not receive input data, and outputs the training data or test data. The training data is constituted of images $x_n$ and labels $y_n$ thereof, for example ($n=1, 2, \ldots, N$, and N is the number of images). The image $x_n$ is the data that has the two-dimensional matrix structure, and is handled as a matrix below. For ease of explanation, "x" means a one-dimensional vector obtained by conducting raster scan on the image $x_n$ in the matrix. The test data has the same configuration.

The label $y_n$ is a K-dimensional vector indicating the type of the image $x_n$ (for example, an animal such as a dog or a cat) with onehot expression for the number of types K of the image $x_n$. In the onehot expression, one cell in the vector corresponds to the type of the image $x_n$. In the vector, all of the elements have 0.0 therein, except for one element, which has 1.0. The type corresponding to the 1.0 cell (a dog, for example) is the correct type. When a medical image such as X-ray, CT, MRI, or ultrasound is input as the image $x_n$, it is possible to predict the type of disease or prognosis of a patient (good or bad).

The output vector $h^1_D$ in the data unit DU1 is calculated with Formula 1 below.

[Formula 1]

$$h^l_D = g(W^l_D h^{l-1}_D) \quad (1)$$

where, $h_D^0 = x$

In Formula 1, the suffix l indicates the level number (the same applies to other formulas below). However, the output vector $h^0_D$ from the data unit DU0, which is the input layer, is the training data or test data. The matrix $W^l_D$ on the right side is one of the learning parameters of the data unit DU1. The function g is an activation function. The activation function is, for example, one of the sigmoid function, the hyperbolic tangent function (tan h function), and the ReLU (Rectified Linear Unit) function. The vector $h^{l-1}_D$ on the right side is the input vector sent to the data unit DU1, that is, the output vector from the data unit DU(l−1) of the preceding stage.

The reporting unit RU1 inputs the output vector $h^l_D$ from the data unit DU1 of the same level and reduces the dimension number of the output vector $h^l_D$. The output vector $h^l_R$ from the reporting unit RU1 is calculated with Formula 2 below.

[Formula 2]

$$h_R^l = g(W_R^l h_D^l) \quad (2)$$

In Formula 2, the matrix $W^l_R$ is one of the learning parameters of the reporting unit RU1. Specifically, if the dimension number of the output vector $h^l_D$ from the data unit DU1 is d, for example, the matrix $W^l_R$ is a matrix where the components from the first row to the m (m<d) row are the same as those of the matrix $W^l_D$, and the components from the d−m+1 row to the k-th row are zero, for example. This reduces the d-dimensional output vector $h^l_D$ from the data unit DU1 to the m-dimensional output vector $h^l_R$.

The suggestion unit SU calculates the weight (output vector $h_S$) of each data unit DU1 using the output vector $h^l_R$ from each reporting unit RU1. The output vector $h_S$ in the suggestion unit SU is calculated with Formula 3 below.

[Formula 3]

$$h_s = \text{softmax}(W_s h_R) \quad (3)$$

In Formula 3, the matrix $W_S$ is the learning parameter of the suggestion unit SU. As shown in Formula 4 below, the softmax function that is one of the activation functions calculates a vector $h_S$ having a dimension equal to the number of layers L (L=3 in this example). The vector $h_R$ on the right side is the vector obtained by stacking $h^l_R$ in the vertical direction.

[Formula 4]

$$h_R = [h_R^1; \ldots ; h_R^L] \quad (4)$$

In the case of $L = 3$ $$h_R^1 = [0, 1, 0]$$
$$h_R^2 = [0, 0, 1] \Rightarrow h_R = \begin{bmatrix} 0 \\ 1 \\ 0 \\ 0 \\ 0 \\ 1 \\ 1 \\ 0 \\ 0 \end{bmatrix} \begin{matrix} \} h_R^1 \\ \\ \} h_R^2 \\ \\ \} h_R^3 \end{matrix}$$
$$h_R^3 = [1, 0, 0]$$

Thus, the matrix $W_S$ is an L-row M-column (M is the number of cells in the vector $h_R$) matrix. By adopting the softmax function in the suggestion unit SU, each element (the sum of all elements is 1) of the vector $h_S$ having the element number L represents the weight of the corresponding data unit DU1.

The identification unit IU identifies the output vector $h^l_D$ of the data unit DU1 (l≥1) of each layer. Specifically, the identification unit IU weights each output vector $h^l_D$ of the data unit DU1 (l≥1) of the intermediate layer with the vector $h_S$, for example. Specifically, the identification unit IU integrates the output vector $h^l_D$ of the data unit DU1 (l≥1) of the intermediate layer to calculate the integrated vector h, for example. The integrated vector h is calculated with Formula 5 below.

[Formula 5]

$$h = \frac{1}{L}\sum_{l=1}^{L} h_s[l] h_D^l \quad (5)$$

In Formula 5, the scalar $h_S[l]$ on the right side represents the one-dimensional element of the vector $h_S$ shown in Formula 3. The output vector $h^l_D$ is weighted by the scalar $h_S[l]$. Next, the identification unit IU calculates a prediction vector t indicating the final predicted value of the label by Formula 6.

[Formula 6]

$$t = f(x) = \text{softmax}(Wh) \quad (6)$$

In Formula 6, the matrix W is the learning parameter of the identification unit IU. In the softmax function, which is one of activation functions, a K-dimensional prediction vector t is output as a predicted value. K is the number of dimensions of the label $y_n$ described above, that is, K is the number of elements. Each dimension of the prediction vector t has stored therein a probability value representing the type of the image $x_n$.

In this embodiment, the calculation method from Formula 1 to Formula 6 and the values of the matrix $W^l_D$, the matrix $W^l_R$, the matrix $W_S$, and the matrix W, which are the learning parameters used in the calculation, called a prediction model. The learning parameters of the prediction model are generated by giving training data $\{x_n, y_n\}$ to the neural network 100.

Thus, when inputting the test data, only the output vector $h^l_D$ that corresponds to the element with the highest probability among the elements of the prediction vector t needs to be output. That is, because the weight of the layer 1 having the higher rate of correctness increases by learning, by reflecting the weight for each layer 1 in the prediction, an error between the predicted value and the true value of the test data can be reduced even when the perceptrons are multilayered, and as a result, overfitting is suppressed.

Example of System Configuration

Figure 2:
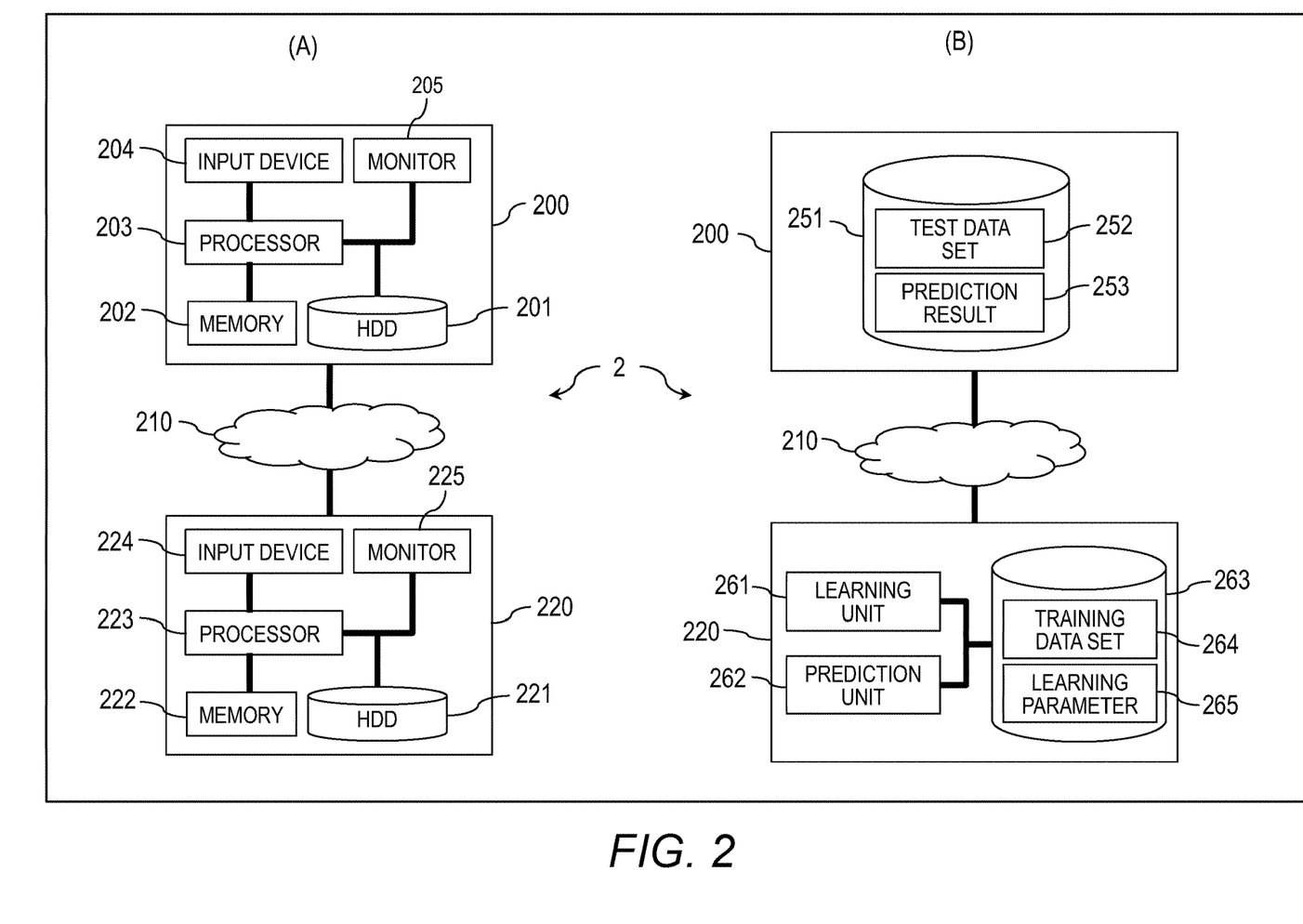
FIG. 2 is a block diagram showing a system configuration example of a data analysis system.

FIG. 2 is a block diagram showing a system configuration example of a data analysis system. In FIG. 2, a data analysis system 2 of the server-client type is shown as an example, but the data analysis system 2 may be of the standalone type. (A) of the FIG. 2 is a block diagram showing a hardware configuration example of the data analysis system 2, and the (B) of the FIG. 2 is a block diagram showing a configuration example of the functions of the data analysis system 2. In FIGS. 2A and 2B, the same configurations are given the same reference characters.

In the data analysis system 2, a client terminal 200 and a data analysis apparatus 220, which is a server, can communicate with each other via a network 210.

In (A) of the FIG. 2, the client terminal 200 includes an HDD (hard disk drive) 201, which is an auxiliary storage device, a memory 202, which is a primary storage device, a processor 203, an input device 204 such as a keyboard and a mouse, and a monitor 205. The data analysis apparatus 220 includes an HDD 221, which is an auxiliary storage device, a memory 222, which is a primary storage device, a processor 223, an input device 224 such as a keyboard and a mouse, and a monitor 225. The primary storage device, the auxiliary storage device, and a portable storage medium, which is not shown in the figure, are collectively referred to as storage devices. The storage devices are configured to store therein the neutral network 100, a neutral network 300 for calculating hyperparameters, which will be explained below, and learning parameters thereof.

In (B) of the FIG. 2, the client terminal 200 includes client data base (DB) 251. The client DB 251 is stored in the storage devices such as the HDD 201 and the memory 202. In the client DB 251, a test data set 252 and a prediction result 253 are stored. The test data set 252 is a set of test data. The prediction result 253 is data obtained from a prediction unit 262 via the network 210. In the server client type, there is at least one client terminal 200.

The data analysis apparatus 220 includes a learning unit 261, a prediction unit 262, and server database (DB) 263. The learning unit 261 is a function unit 15 that conducts processes shown in FIGS. 1 and 2 and that outputs learning parameters 265. The learning parameters 265 include the learning parameters described above.

The prediction unit 262 is a functional unit that constructs the neural network 100 using the learning parameters 265, executes a prediction process when test data is given to the neural network 100, and outputs the prediction result 253 to the client terminal 200. The learning unit 261 and the prediction unit 262 realize the functions thereof by causing the processor 223 to execute programs stored in a storage device such as the HDD 221 and the memory 222.

The server DB 263 stores a training data set 264 and the learning parameters 265. The training data set 264 includes the image $x_n$ and label $y_n$ described above. The learning parameter 265 is output data from the learning unit 261 and includes a matrix $W^l_D$, a matrix $W^l_R$, a matrix $W_S$, and a matrix W.

There may be a plurality of data analysis apparatuses 220. A plurality of data analysis apparatuses 220 may be provided for the purpose of load distribution, for example. There may be a plurality of data analysis apparatuses 220 having different functions. For example, the data analysis apparatus 220 may have a first server including the learning unit 261 and the server DB 263, and a second server including the prediction unit 262 and the server DB 263. Alternatively, the data analysis apparatus 220 may include a first data analysis apparatus including the learning unit 261 and the prediction unit 262, and a second data analysis apparatus including a server DB 263. Alternatively, the data analysis apparatus 220 may include a first data analysis apparatus including the learning unit 261, a second data analysis apparatus including the prediction unit 262, and a third data analysis apparatus including a server DB 263.

Functional Configuration Example of Data Analysis Device

Figure 3:
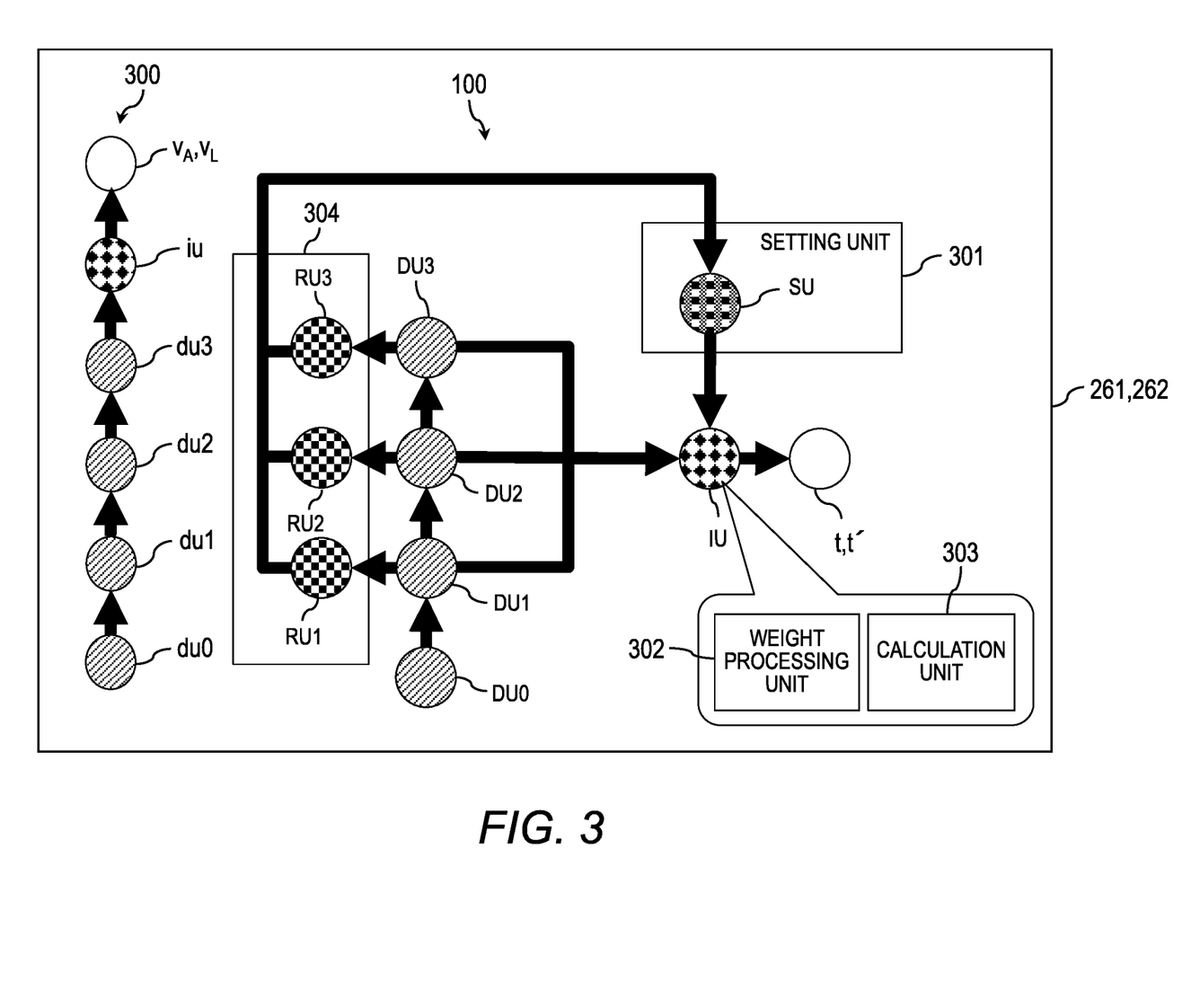
FIG. 3 is a block diagram showing a functional configuration example of the data analysis apparatus.

FIG. 3 is a block diagram showing a functional configuration example of the data analysis apparatus 220. As shown in FIG. 2, the data analysis apparatus 220 includes the learning unit 261 and the predication unit 262. The learning unit 261 learns each learning parameter for the neutral network 100, and the neutral network 300 for calculating hyperparameters. The prediction unit 262 calculates prediction data t' by giving the test data to the neutral network 100 after the learning parameter 265 thereof is determined.

A general neural network may be used for the neural network 300 for calculating hyperparameter. Although FIG. 3 shows only one neural network 300 for calculating hyperparameter, each hyperparameter has one neural network 300 for calculating hyperparameter. In the neural network 300 for calculating hyperparameter, a data unit du0 of a layer 1'=0, which is the input layer, data units du1 to du3 of layers 1'≤1 (in this example, number of layers L'=3), which are the intermediate layer, and an identification unit iu, which is the output layer, are connected in series. Each layer is constituted of perceptron.

The data analysis apparatus 220 includes a setting unit 301, a weight processing unit 302, a calculation unit 303, and a degeneration unit 304. The setting unit 301, the weighting processing unit 302, the calculation unit 303, and the degeneration unit 304 realize the functions thereof by causing the processor 223 to execute programs stored in a storage device such as the HDD 221 and the memory 222.

The setting unit 301 receives output data from the data unit DUl of each intermediate layer, sets the weight of the data unit DUl of each intermediate layer based on each output data and the learning parameter (matrix $W_S$), and outputs the weight to the identification unit IU, which is the output layer. The setting unit 301 is the function realized by the suggestion unit.

The weight processing unit 302 weights the output data from the data unit DUl of the intermediate layer by the weight of the data unit DUl of each intermediate layer set by the setting unit 301. The calculation unit 303 calculates the prediction data t, t' based on each output data, which was weighted by the weight processing unit 302, and the learning parameter (matrix W). The weight processing unit 302 and the calculation unit 303 are the functions realized by the identification unit IU.

The degeneration unit 304 receives output data from each first intermediate layer, reduces the number of dimensions of each output data, and outputs each degenerated output data to the setting unit 301. The degeneration unit 304 is the function realized by the reporting unit RUI.

Data Analysis Process Example

Figure 4:
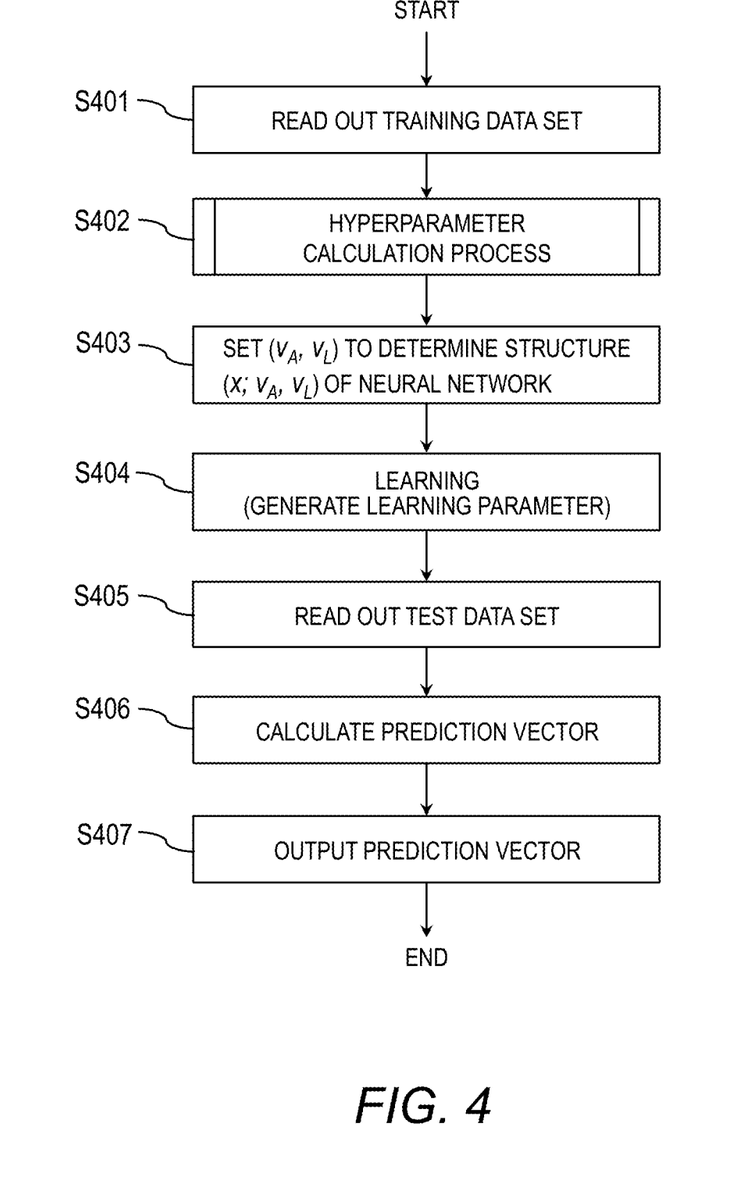
FIG. 4 is a flowchart showing an example of the data analysis process by the data analysis apparatus.

FIG. 4 is a flowchart showing an example of the data analysis process by the data analysis apparatus 220. In FIG. 4, Steps S401 to S404 are the learning process by the learning unit 261, and Steps S405 to S407 are the predication process by the predication unit 262. First, the data analysis apparatus 220 reads out the training data set 264 (Step S401), and executes the hyperparameter calculation process (Step S402). The hyperparameter is a parameter that determines the structure of the neural network. The hyperparameter includes a first hyperparameter that determines the pattern (type), and a second hyperparameter that determines the sequence.

Examples of the first hyperparameter include the type of activation function, the type of loss function, the type of regularization (function), and the type of neural network. In this example, the first hyperparameter is a hyperparameter $v_A$, which is for the type of activation function. Examples of the second hyperparameter include the number of layers L of the intermediate layer, and the number of units in the intermediate layer. In this example, the second hyperparameter is a hyperparameter $v_L$, which is the number of layers L of the intermediate layer. The hyperparameter calculation process (Step S402) will be described in detail below.

The data analysis apparatus 220 determines the structure of the neural network 100 using the hyperparameter calculated in the hyperparameter calculation process (Step S402) (Step S403). For example, the data analysis apparatus 220 sets the hyperparameter $v_A$ for the type of activation function and the hyperparameter $v_L$ for the number of layers L of the intermediate layer, and determines, as the structure of the neural network 100, the function f (x; $v_A$, $v_L$) of the identification unit IU.

The data analysis apparatus 220 conducts a learning process by giving the training data $\{x_n, y_n\}$ to the neural network 100 after the structure thereof is determined, and generates a learning parameter 265 (matrix $W^l_D$, matrix $W^l_R$, matrix $W_S$, matrix W) (Step S404). In the learning (Step S404), for example, the learning parameter 265 is adjusted by the back propagation. The data analysis apparatus 220 stores the generated learning parameter 265 in the server DB 263.

Next, the data analysis apparatus 220 reads the test data set 252 (Step S405), gives the image $x'_n$ of each test data to the neural network 100 after the learning parameter 265 is determined, and calculates the prediction vector t' (Step S406). The data analysis apparatus 220 outputs the prediction result 253, which is a set of prediction vectors t', to the client terminal 200 (Step S407). The client terminal 200 displays the prediction result 253 in the monitor 205.

<Hyperparameter Calculation Process (Step S402)>

In the hyperparameter calculation process (Step S402), the data analysis apparatus 220 calculates the hyperparameters $v_A$, $v_L$, for example, by using the neural network 300 for calculating hyperparameter that differs from the neural network 100 shown in FIG. 1.

The hyperparameter $v_A$ is a hyperparameter having stored therein a value indicating the type of the activation function, which is one of the sigmoid function, the hyperbolic tangent function, and the ReLU function, as an onehot vector. For example, if $v_A$=(1, 0, 0), the type of the activation function is the sigmoid function, if $v_A$=(0, 1, 0), the type of the activation function is the hyperbolic tangent function, and if $v_A$=(0, 0, 1), the type of the activation function is the ReLU function. The hyperparameter $v_A$ is calculated by Formula 7 below.

[Formula 7]

$$v_A = f_A(x) = \mathrm{softmax}(W_A^{L'} \ldots g(W_A^{l'} \ldots g(W_A^0 x) \ldots ) \ldots ) \quad (7)$$

In Formula 7, the matrix $W''_A$ is one of the learning parameters 265. The initial value of the matrix $W''_A$ is set prior to the hyperparameter calculation process (Step S402). L' is the number of layers in the neural network 300 for calculating the hyperparameter $v_A$. In this embodiment, L'=3. The number of layers L' may be any number. The g ($W^0_A$) on the right side is the perceptron (g( ) is the activation function) of the input layer (data unit du0) of the neural network 300 for calculating the hyperparameter $v_A$. The g ($W^{l'}_A$) on the right side is the perceptron of the intermediate layer (data unit dul'), which is the l' layer of the neural network 300 for calculating the hyperparameter $v_A$. The $f_A(x)$ is the perceptron (softmax function) of the output layer (identification unit iu) of the neural network 300 for calculating the hyperparameter $v_A$.

The hyperparameter $v_L$ is a hyperparameter in which the number of layers L in the intermediate layer of the neural network 100 is stored in the section [0, 1] as normalized continuous values. If the number of layers L of the intermediate layer is L=10, or in other words, if the intermediate layer can have up to ten layers, for example, l is normalized such as l=1 is 0.1, l=2 is 0.2, . . . , and l=10 is 1.0. The hyperparameter $v_L$ is calculated by Formula 8 below.

[Formula 8]

$$v_L = f_L(x) = W_L^{L'} \ldots g(W_L^{l'} \ldots g(W_L^0 x) \ldots ) \quad (8)$$

In Formula 8, the matrix $W''_L$ is one of the learning parameters 265. The initial value of the matrix $W''_L$ is set prior to the hyperparameter calculation process (Step S402). L' is the number of layers in the neural network 300 for calculating the hyperparameter $v_L$. In this embodiment, L'=3. The number of layers L' may be any number. The g ($W^0_L$) on the right side is the perceptron (g( ) is the activation function) of the input layer (data unit du0) of the neural network 300 for calculating the hyperparameter $v_L$. The g ($W^{l'}_L$) is the perceptron of the intermediate layer (data unit dul'), which is the l' layer of the neural network 300 for calculating the hyperparameter $v_L$. The $f_L(x)$ is the perceptron (softmax function) of the output layer (identification unit iu) of the neural network 300 for calculating the hyperparameter $v_L$.

When calculating the hyperparameter $v_L$, since the number of layers L of the intermediate layer is normalized in the section [0, 1], the hyperparameter $v_L$ is obtained by denormalizing the number of layers with the reciprocal of the magnification used for the normalization. For example, in the case where the number of layers L of the intermediate layer (L=10) is normalized as 1/10, the hyperparameter $v_L$ is multiplied by 10 to indicate the number of layers. Floating point numbers are truncated. By constructing the function f (x; $v_A$, $v_L$) of the identification unit IU by the hyperparameters $v_A$ and $v_L$ in this manner, learning parameters (matrices $W''_A$ and $W''_L$) can be determined toward the direction in which the correct value of the prediction vector t increases.

In the hyperparameter calculation process (Step S402), the data analysis apparatus 220 calculates Q(v) using the behavior value function of Formula 9 below.

[Formula 9]

$$Q(v) = W_Q^{L'} \ldots g(W_Q^{l'} \ldots g(W_Q^{0} v) \ldots) \ldots) \quad (9)$$

In Formula 9, the matrix $W_Q^{l'}$ is one of the learning parameters 265. The initial value of the matrix $W_Q^{l'}$ is set prior to the hyperparameter calculation process (Step S402). The vector v on the left side is a vector obtained by stacking the hyperparameters $v_A$, $v_L$, and x in the vertical direction as shown in Formula 10 below.

[Formula 10]

$$v = [v_A; v_L; x] \quad (10)$$

$$v_A = [0.7, 0.2, 0.1]$$
$$v_L = 0.6$$
$$x = [1, 2, 3, 4]$$

$$\Rightarrow v = \begin{bmatrix} 0.7 \\ 0.2 \\ 0.1 \\ 0.6 \\ 1 \\ 2 \\ 3 \\ 4 \end{bmatrix} \begin{matrix} \}v_A \\ \}v_L \\ \}x \end{matrix}$$

Figure 5:
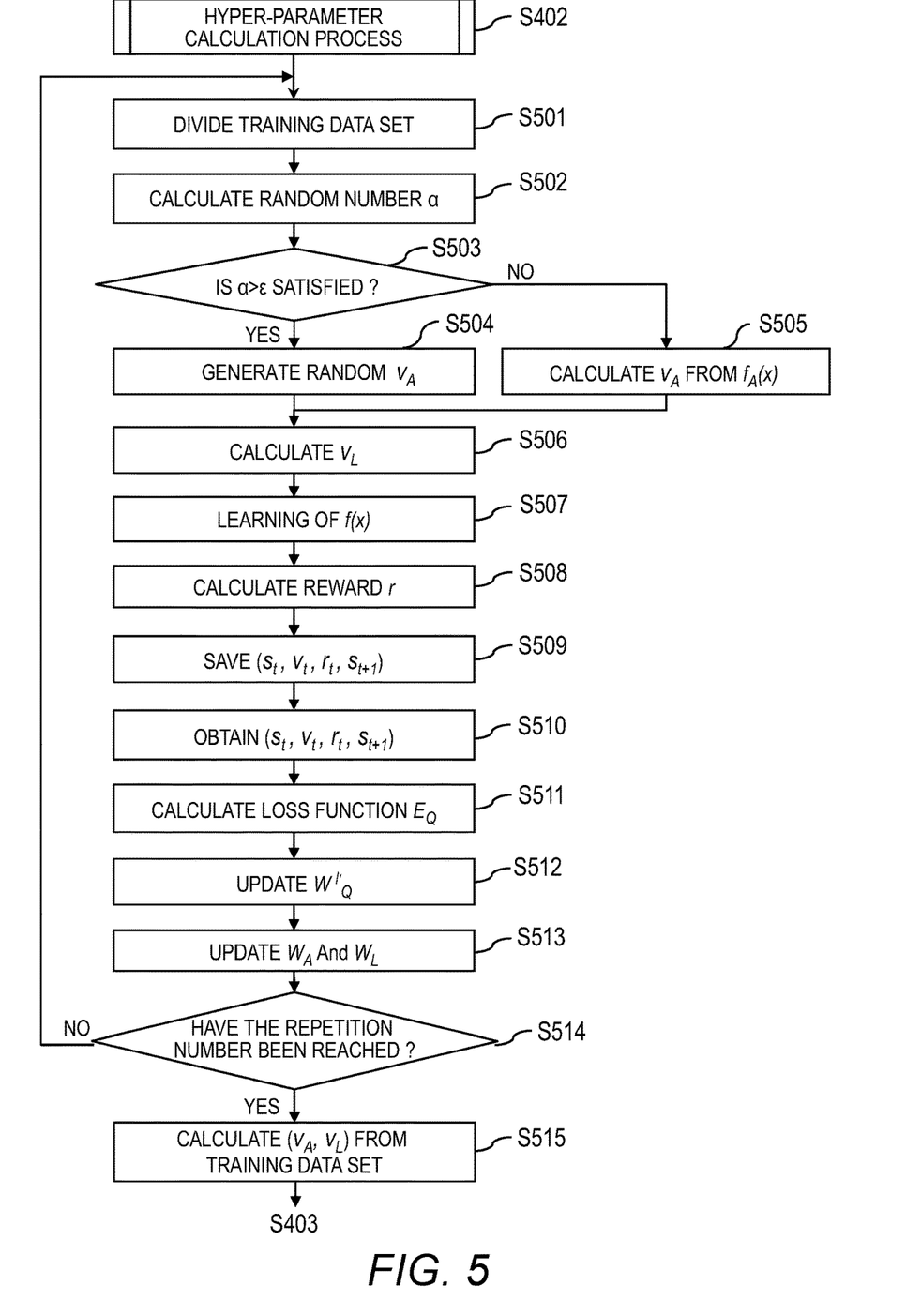
FIG. 5 is a flowchart showing a detailed process step example of the hyperparameter calculation process (Step S 402) shown in FIG. 4.

FIG. 5 is a flowchart showing a detailed process step example of the hyperparameter calculation process (Step S402) shown in FIG. 4. The data analysis apparatus 220 divides the training data set 264 read in Step S401 (Step S501). Specifically, the data analysis apparatus 220 divides the training data set 264 randomly into 9:1, for example (the division ratio is merely an example). That is, 90% of the training data set 264 is set as a training data set for hyperparameters and the remaining 10% is used as a test data set for hyperparameters. The hyperparameter training data in the hyperparameter training data set is $u_t$ and the hyperparameter test data in the hyperparameter test data set is $s_t$.

Next, the data analysis apparatus 220 calculates a random number α (Step S502) and determines whether or not the random number α is smaller than ε (Step S503). ε is the value in the section [0, 1], and ε=0.3, for example. If the random number α is smaller than ε (Step S503: Yes), the data analysis apparatus 220 randomly generates the hyperparameter $v_A$ and proceeds to Step S506 (Step S504). If the random number α is equal to or greater than ε (Step S503: No), the data analysis apparatus 220 calculates the hyperparameter $v_A$ by $f_A(x)$ of Formula 7, and proceeds to Step S506 (Step S505).

Next, the data analysis apparatus 220 calculates the hyperparameter $v_L$ by Formula 11 using Formula 8 (Step S506).

[Formula 11]

$$v_L = f_L(x) + N_t \quad (11)$$

In Formula 11, Nt in the second term on the right side is a random number generated within the section [0, 1]. Because this determines the hyperparameters $v_A$ and $v_L$, the function f (x; $v_A$, $v_L$) of the identification unit IU, which indicates the structure of the neural network 100, is tentatively determined.

Next, the data analysis apparatus 220 learns the function f (x; $v_A$, $v_L$) of the tentatively determined identification unit IU (Step S507). Specifically, as shown in Formula 12 below, the data analysis apparatus 220 gives each hyperparameter training data $u_t$ of the hyperparameter training data set to the cross entropy E related to tentatively determined f (x; $v_A$, $v_L$), thereby conducting a process to minimize the cross entropy E, for example. For the minimizing process, the stochastic gradient descent method is used. As a result, the learning parameters 265 (matrix $W^l_D$, matrix $W^l_R$, matrix $W_S$, matrix W) of the function f (x; $v_A$, $v_L$) of the tentatively determined identification unit IU are updated.

[Formula 12]

$$E = -\sum_{n=1}^{N} \sum_{k=1}^{K} t_n[k] \log(y_n[k]) \quad (2)$$

In Formula 12, $t_n[k]$ is the k-dimensional element of the prediction vector t for the training data $x_n$, which is the hyperparameter training data $u_t$. For example, when the prediction vector $t_n$ satisfies $t_n=[0, 0, 1]$, $t_n[k=1]=0$, $t_n[k=2]=0$, and $t_n[k=3]=1$. Similarly, $y_n[k]$ is the k-dimensional element of the label $y_n$ for the training data $x_n$, which is the hyperparameter training data $u_t$. For example, when the label $y_n$ satisfies $y_n=[0, 0, 1]$, $y_n[k=1]=0$, $y_n[k=2]=0$, and $y_n[k=3]=1$.

Next, the data analysis apparatus 220 calculates a reward r as an AUC (Area Under Curve) from the prediction vector t indicating the predicted value and the label $y_n$ indicating the true value (Step S508). The prediction vector t in Step S507 is calculated by giving the hyperparameter test data $s_t$ to f (x; $v_A$, $v_L$) after learning (Step S507).

Specifically, for example, the data analysis apparatus 220 generates an ROC (Receiver Operating Characteristic) curve on a graph in which the vertical axis is the true positive rate and the horizontal axis is the false positive rate, and calculates the area under the curve as the reward r.

The true positive is the property of judging a positive person as positive, and in this case, it means that a true value, which is an element in the label $y_n$, or an element of the prediction vector t corresponding to a value indicating the correct answer (1.0), is deemed correct. For example, if the element of the prediction vector t corresponding to the value indicating the correct answer (1.0) is 0.6, and if the threshold value is 0.5, the element 0.6 indicates the correct answer, i.e., true positive.

The false positive is the property of judging a negative person as positive, and in this case, it means that a false value, which is an element in the label $y_n$, or an element of the prediction vector t corresponding to a value indicating the false answer (0.0), is deemed correct. For example, if the element of the prediction vector t corresponding to the value indicating a false answer (0.0) is 0.6, and if the threshold value is 0.5, the element 0.6 indicates the correct answer, i.e., false positive.

The horizontal axis may alternatively be the false negative rate. The false negative is the property of judging a positive person as negative, and in this case, it means that a true value, which is an element in the label $y_n$, or an element of the prediction vector t corresponding to a value indicating the correct answer (1.0), is deemed false. For example, if the element of the prediction vector t corresponding to the value indicating the correct answer (1.0) is 0.4, and if the threshold value is 0.5, the element 0.4 indicates a false answer, i.e., false negative.

Next, the data analysis apparatus 220 randomly divides the training data set 264 into 9:1, thereby setting 90% of the data as the hyperparameter training data $u_{t+1}$ and 10% of the data as the hyperparameter test data $s_{t+1}$, and stores the data set ($s_t$, $v_t$, $r_t$, $s_{t+1}$) in the memory 222 (Step S509).

$s_t$ is the hyperparameter test data. $v_t$ is a vector generated by replacing the one-dimensional vector x with the hyperparameter training data $u_t$ in Formula 10. $r_t$ is the reward r from which the predication vector t was calculated.

Next, the data analysis apparatus 220 randomly acquires the I number of data sets $(s_i, v_i, r_i, s_{i+1})$ from the memory 222 (Step S510)

The data analysis apparatus 220 calculates the loss function $E_Q$ by Formula 13 below (Step S511).

[Formula 13]

$$E_Q = \frac{1}{I}\sum_{i=1}^{I}(q_i - Q(v_i))^2 \qquad (13)$$

In Formula 13, $Q(v_i)$ on the right side is a value obtained by applying Formula 9 above to $v_i$ in the data set $(s_i, v_i, r_i, s_{i+1})$ obtained in Step S510. $q_i$ on the right side is calculated by Formula 14 below.

[Formula 14]

$$q_i = r_i + \gamma Q(v_i) \qquad (14)$$

In Formula 14, γ on the right side is the discount rate, and set within the section [0.1].

The data analysis apparatus 220 updates the learning parameter $W''_Q$ of Formula 9 by applying the stochastic gradient descent method to the loss function $E_Q$ of Formula 13 (Step S512).

The data analysis apparatus 220 updates the learning parameter $W_A$ of $f_A(x)$ of Formula 7 by the gradient method using the gradient obtained by partially differentiating the loss function $E_Q$ with the hyperparameter $v_A$, and updates the learning parameter $W_L$ of $f_L(x)$ of Formula 8 by the gradient method using the gradient obtained by partially differentiating the loss function $E_Q$ with the hyperparameter $v_L$ (Step S513).

Thereafter, the data analysis apparatus 220 determines whether or not the process from Step S501 has been executed for a prescribed number of times (1000 times, for example) (Step S514). If the prescribed number of times has not been reached (Step S514: No), the process returns to Step S501. On the other hand, when the process has been executed for the prescribed number of times (step S514: Yes), the data analysis apparatus 220 calculates the optimal hyperparameter $v_A$ by giving the training data $x_n$ to $f_A(x)$ in Formula 7, and calculates the optimal hyperparameter $v_L$ by giving the training data $x_n$ to $f_L(x)$ in Formula 7 (Step S515).

Specifically, the data analysis apparatus 220 gives each training data $x_n$ to $f_A(x)$ of Formula 7, thereby calculating the hyperparameter $v_A$ for each training data $x_n$, for example. Then, the data analysis apparatus 220 calculates the statistical value of the hyperparameter $v_A$ for each training data $x_n$, and sets the statistical value as the optimal hyperparameter $v_A$. The statistical value is a median value, an average value, a minimum value, or a maximum value in the hyperparameter $v_A$ for each training data $x_n$. The same applies to the optimal hyperparameter $v_L$. In this way, the optimal hyperparameters $(v_A, v_L)$ are determined, and the process moves to Step S403.

<Data Analysis Results>

Figure 6:
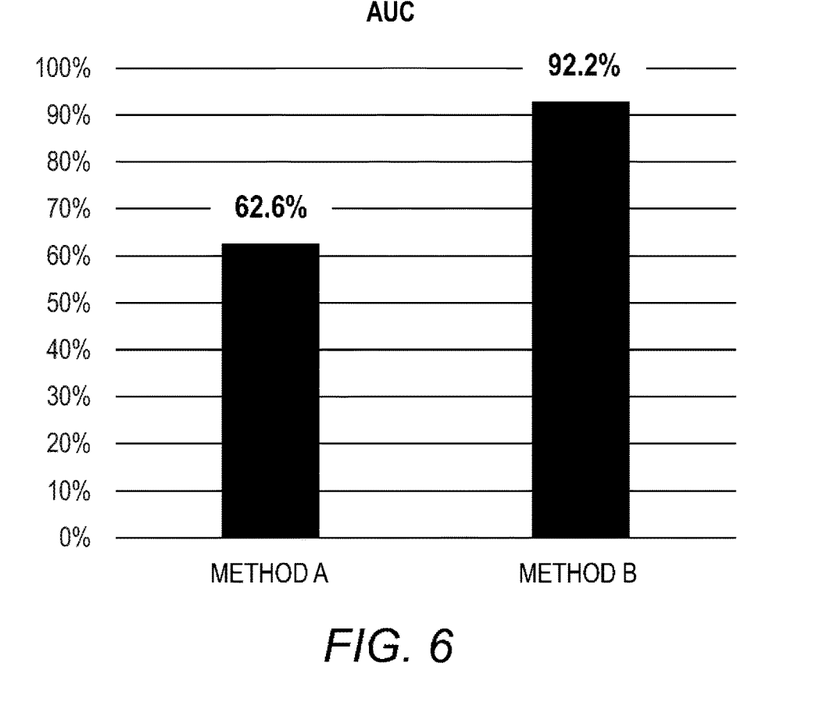
FIG. 6 is a diagram for explaining a comparison example of the data analysis results.

FIG. 6 is a diagram for explaining a comparison example of the data analysis results. The vertical axis of the graph of FIG. 6 is AUC, that is, the probability of true positive. Specifically, the vertical axis is the probability of an element of the prediction vector t corresponding to the value (1.0) indicating a correct answer, which is an element in the label $y_n$, being a correct answer. Method A is a conventional method, that is, a data analysis method using the neural network of WO2014/105866, and Method B is a data analysis method using the neural network 100 of this embodiment. As for the hyperparameters in both Method A and Method B, the number of layers L was ten layers, and the activation function was the Sigmoid function.

In this example, the result of a credit card approval review was to be predicted, and therefore, the credit card review information was used as $x_n$, instead of images. The review information $x_n$ was 15-dimensional vector data that stores the income information of an applicant or the like. The label $y_n$ is a vector indicating the result of the review (0: declined, 1: approved) in the onehot expression. The number N of training data was 621, and the number N of test data was N=69. With Method B, the accuracy is improved by about 30% as compared with Method A.

Embodiment 2

Embodiment 2 shows a modification example of the structure of the neural network 100 of Embodiment 1. The neural network of Embodiment 2 has a simpler configuration than Embodiment 1 and because the calculation amount is reduced, the time required for the learning process is shorter. In Embodiment 2, differences from Embodiment 1 will be mainly explained, and therefore, the explanation of the same content as Embodiment 1 is omitted.

Figure 7:
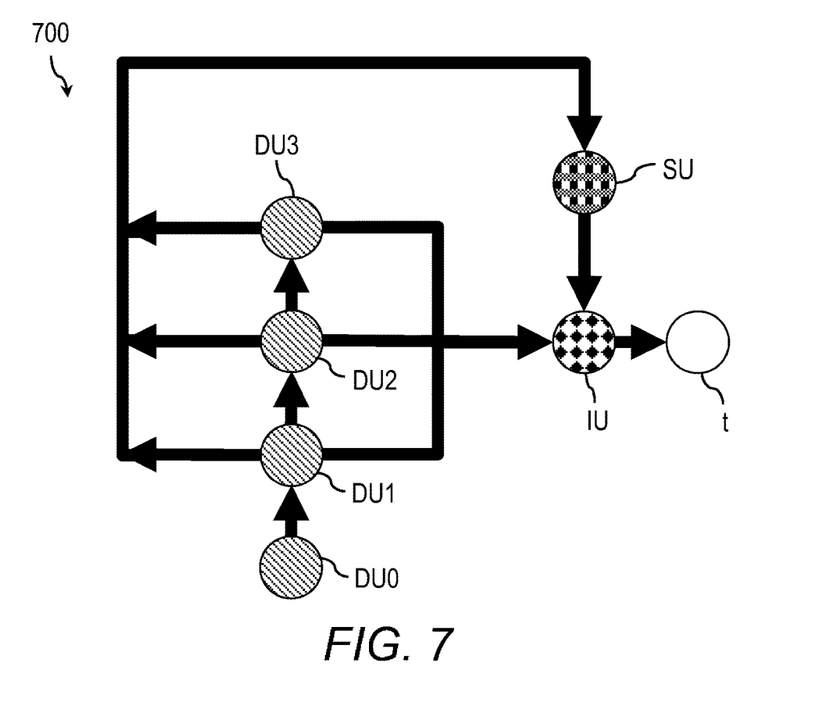
FIG. 7 is a diagram for explaining a configuration example of the neural network of Embodiment 2.

FIG. 7 is a diagram for explaining a configuration example of the neural network of Embodiment 2. The neural network 700 does not have the reporting unit RU1. Thus, in Embodiment 2, Formula 2 is unnecessary. In Embodiment 2, Formula 15 below applies instead of Formula 3.

[Formula 15]

$$h_s = \text{softmax}(W_s h_D) \qquad (15)$$

Thereafter, in a manner similar to Embodiment 1, by applying Formula 5 and Formula 6, the data analysis apparatus 220 can calculate the prediction vector t. As described above, the calculation process by the reporting unit RU1 is no longer necessary, which makes it possible to speed up the learning process.

Embodiment 3

Embodiment 3 is a modification example of the structure of the neural network 100 of Embodiment 1. The neural network of Embodiment 3 has a simpler configuration than Embodiment 1 and because the calculation amount is reduced, the time required for the learning process is shorter. In Embodiment 3, differences from Embodiment 1 will be mainly explained, and therefore, the explanation of the same content as Embodiment 1 is omitted.

Figure 8:
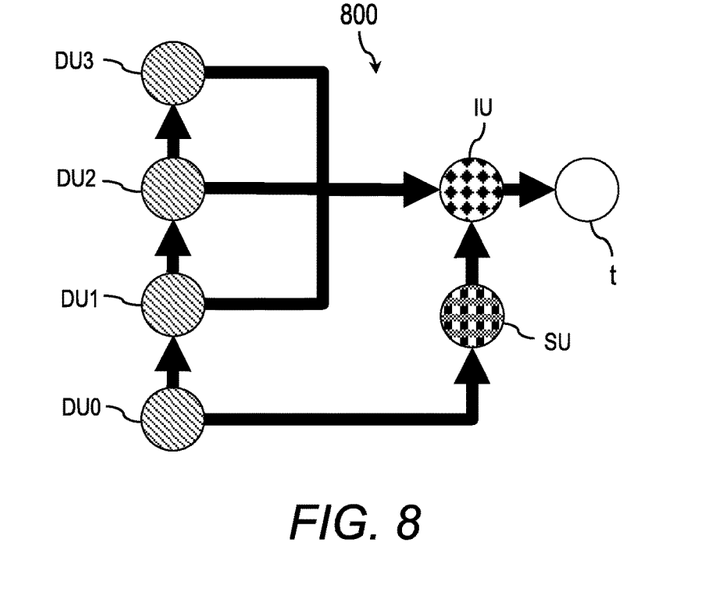
FIG. 8 is a diagram for explaining a configuration example of the neural network of Embodiment 3.

FIG. 8 is a diagram for explaining a configuration example of the neural network of Embodiment 3. The neural network 800 does not have the reporting unit RU1. Thus, in Embodiment 3, Formula 2 is unnecessary.

The output data from the data unit DU$l$ ($l≥1$) of the intermediate layer is input into the identification unit IU only. The output data from the data unit DU0, which is the input layer, such as the training data $x_n$ is input to the suggestion unit SU. Thus, in Embodiment 2, Formula 16 below applies instead of Formula 3 and Formula 4.

[Formula 16]

$$h_s = \text{softmax}(W_s x) \qquad (16)$$

Thereafter, in a manner similar to Embodiment 1, by applying Formula 5 and Formula 6, the data analysis apparatus 220 can calculate the prediction vector t. As described above, the calculation process by the reporting unit RUl is no longer necessary, which makes it possible to speed up the learning process. Since the input to the suggestion unit SU is only the training data $x_n$ from the data unit DU0, which is the input layer, the calculation load of the suggestion unit SU is reduced, which makes it possible to improve the efficiency of the learning process.

Embodiment 4

Embodiment 4 shows a modification example of the structure of the neural network 100 of Embodiment 1. The neural network of Embodiment 4 has an additional unit that degenerates the dimension, which is similar to the reporting unit RUl, thereby improving the efficiency of the learning process. In Embodiment 4, differences from Embodiment 1 will be mainly explained, and therefore, the explanation of the same content as Embodiment 1 is omitted.

Figure 9:
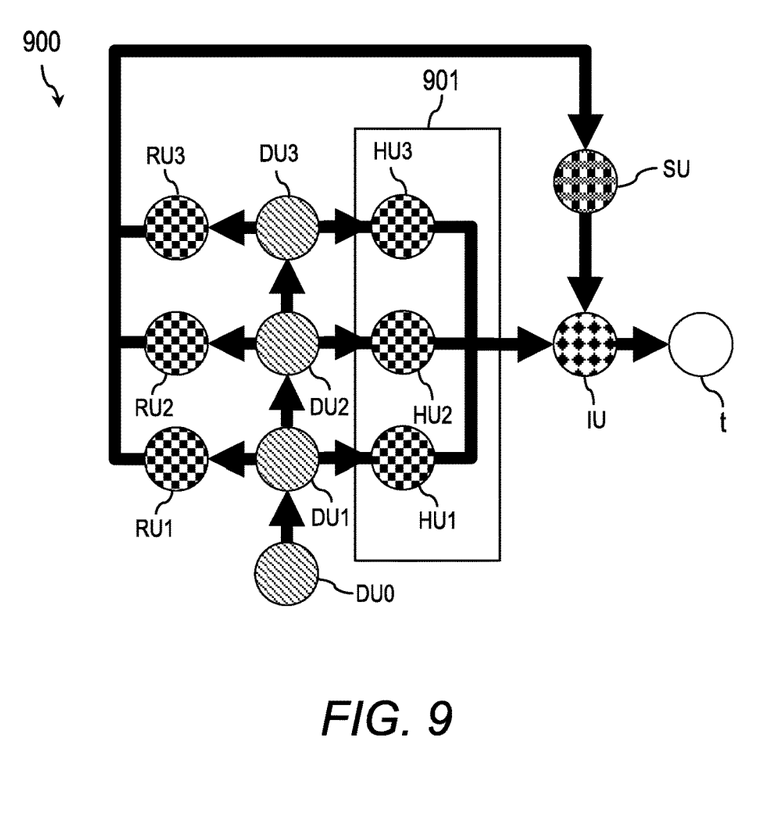
FIG. 9 is a diagram for explaining a configuration example of the neural network of Embodiment 4.

FIG. 9 is a diagram for explaining a configuration example of the neural network of Embodiment 4. The neural network 900 has a structure in which a harmonizing unit is added to the neural network of Embodiment 1. The harmonizing unit HUl (l≥1) is provided for each data unit DUl (l≥1) of the intermediate layer and disposed between the data unit DU (l≥1) of the intermediate layer and the identification unit. Similar to the reporting unit RUl, the harmonizing unit HUl is the degeneration unit 901 that degenerates the output data from the data unit DUl (l≥1) of the intermediate layer. Therefore, data dimensionally degenerated by the harmonizing unit HUl is input to the identification unit IU.

The harmonizing unit HUl inputs the output vector $h^l_D$ from the data unit DUl of the same level and reduces the dimension number of the output vector $h^l_D$. The output vector $h^l_H$ from the harmonizing unit HUl is calculated with Formula 17 below.

[Formula 17]

$$h_H^l = g(W_H^l h_D^l) \qquad (17)$$

In Formula 17, the matrix $W^l_H$ is the learning parameter of the harmonizing unit HUl. Specifically, if the dimension number of the output vector $h^l_D$ from the data unit DUl is d, for example, the matrix $W^l H$ is a matrix where the components from the first row to the m (m<d) row are the same as those of the matrix $W^l_D$, and the components from the d−m+1 row to the k-th row are zero, for example. With this, the d-dimensional output vector $h^l_D$ from the data unit DUl is reduced to the m-dimensional output vector $h^l_H$. m is the hyperparameter that determines the dimension degeneration. d and m may differ from d and m of the reporting unit RUl.

Because the output vector $h^l H$ from the harmonizing unit HUl is input into the identification unit IU, Formula 18 below is applied instead of Formula 5.

[Formula 18]

$$h = \frac{1}{L}\sum_{l=1}^{L} h_s[l] h_H^l \qquad (18)$$

Thereafter, in a manner similar to Embodiment 1, by applying Formula 6, the data analysis apparatus 220 can calculate the prediction vector t. As described above, by using the harmonizing unit HUl, the output vector $h^l_D$ from the data unit, which is input into the identification unit, is dimensionally degenerated, which makes it possible to reduce the calculation load of the identification unit IU and the learning process is made more efficient.

Embodiment 5

In Embodiment 5, regression is executed as the calculation method of f(x) of Formula 6 in Embodiments 1 to 4. The training data and the test data of Embodiment 5 are medical images, and the data analysis apparatus 220 predicts the period until the recurrence of a disease after surgery.

The training data includes medical images $x_n$ and the period until recurrence $y_n$ (n=1, 2, ... N, and N is the number of images). The medical image $x_n$ is the data that has the two-dimensional matrix structure, and is handled as a matrix below.

For ease of explanation, "x" means a one-dimensional vector obtained by conducting raster scan on the image $x_n$ in the matrix. The test data has the same configuration. The period until recurrence is a k-dimensional vector in which the period until recurrence by age group is stored. K indicates the number of age groups.

In Embodiment 5, Formula 19 below applies instead of Formula 6. t is a scalar and indicates the predicted period until recurrence.

[Formula 19]

$$t = f(x) = Wh \qquad (19)$$

In Embodiment 5, in Step S507 of FIG. 5, the data analysis apparatus 220 learns f(x) of Formula 19 constituted of the hyperparameters $v_A$ and $v_L$, that is, the function f(x; $v_A$, $v_L$) of the identification unit IU that is tentatively determined (Step S 507).

Specifically, as shown in Formula 20 below, the data analysis apparatus 220 gives each hyperparameter the training data $u_t$ of the hyperparameter training data set to the error sum of squares E related to tentatively determined f(x; $v_A$, $v_L$) of the identification unit IU, thereby conducting a process to minimize the error sum of squares E, for example. For the minimizing process, the stochastic gradient descent method is used. As a result, the learning parameters 265 (matrix $W^l_D$, matrix $W^l_R$, matrix $W^l_H$, matrix $W_S$, matrix W) of the tentatively determined function f(x; $v_A$, $v_L$) of the identification unit IU are updated.

[Formula 20]

$$E = \sum_{n=1}^{N}(y_n - t_n)^2 \qquad (20)$$

In the calculation of the reward r in Step S508, the data analysis apparatus 220 calculates the reward r as the determination coefficient $R^2$ from the predicted period t until the recurrence, which is the predicted value, and the period $y_n$ until the recurrence, which is the true value, by Formula 21 below.

[Formula 21]

$$r = R^2 = 1 - \frac{\Sigma(y_n - f_n)^2}{\Sigma_n(y_n - y_{av})^2} \qquad (21)$$

As described above, the data analysis apparatus 220 according to this embodiment uses the first neural network (neural network 700) that includes the first input layer (data unit DU0), the first output layer (identification unit IU), and the first intermediate layer (data unit DUl) of at least two layers disposed between the first input layer and the first output layer, the first intermediate layer being configured to give data from the previous layer and the first learning parameter (matrix $W^I_D$) to the first activation function (g( )) for calculation and output the calculation result to the subsequent layer.

The data analysis apparatus 220 includes a setting unit 301, a weight processing unit 302, and a calculation unit 303. The setting unit 301 receives the output data (output vector $h^I_D$) from each first intermediate layer, sets the weight of each first intermediate layer (output vector $h_S$) based on each output data and the second learning parameter (matrix $W_S$), and outputs the weight to the first output layer (the suggestion unit SU).

The weight processing unit 302 is included in the first output layer, and weights each output data with the weight of each layer of the first intermediate layer that was set by the setting unit 301 (identification unit IU). The calculation unit 303 is included in the first output layer, and calculates the prediction data (predication vector t) based on each output data, which was weighted by the weight processing unit 302, and the third learning parameter (matrix W).

That is, by reflecting the weight for each layer 1 in the prediction, an error between the predicted value and the true value of the test data can be reduced even when the perceptrons are multilayered, and as a result, overfitting can be suppressed.

As shown with the neural network 800, the setting unit 301 may receive the output data (output vector $h^0_D=x_n$) from the first input layer, set the weight of each first intermediate layer based on the output data and the second learning parameter, and output the weight to the first output layer. This makes it possible to reduce the calculation load of the suggestion unit SU, which is the setting unit 301, and as a result, the leaning process can be more efficient.

In the case of neural network 100, the data analysis apparatus 220 includes the first degeneration unit 304 (reporting unit RU1). The first degeneration unit 304 receives output data from each first intermediate layer, reduces the number of dimensions of each output data, and outputs each degenerated output data to the setting unit 301. The setting unit receives each output data that was reduced by the first degeneration unit 304, sets the weight of each first intermediate layer based on the reduced output data and the second learning parameter, and outputs the weight to the first output layer. This makes it possible to reduce the data amount of the output data from each first intermediate layer, and as a result, the load of the weight setting at the setting unit 301 can be reduced.

The data analysis apparatus 220 also includes a learning unit 261 that adjusts the first learning parameter, the second learning parameter, and the third learning parameter by the back propagation method, for example, when the training data is given to the first input layer. Thus, by learning of the learning parameters, the weight of the layer 1 with the higher accuracy rate is made higher. That is, by reflecting the weight for each layer 1 in the prediction, an error between the predicted value and the true value of the test data can be reduced even when the perceptrons are multilayered, and as a result, overfitting can be suppressed.

In the case of neural network 900, the data analysis apparatus 220 includes the second degeneration unit 901 (harmonizing unit HU1). The second degeneration unit 901 receives output data from each first intermediate layer, reduces the number of dimensions of each output data, and outputs each degenerated output data to the weight processing unit 302. The weight processing unit 302 weights each degenerated output data from the second degeneration unit 901 based on the weight of each first intermediate layer. This makes it possible to reduce the data amount of the output data from each first intermediate layer, and as a result, the load of the weight setting at the weight processing unit 302 can be reduced.

The learning unit 261 uses the second neutral network (neutral network 300 for calculating hyperparameter). The second neural network includes the second input layer (data unit du0) that receives the training data, the second output layer (identification unit iu) that outputs hyperparameters ($v_A$, $v_L$) of the first neural network, and the second intermediate layer (data unit dul') disposed between the second input layer and the second output layer, the second intermediate layer being configured to give data from the previous layer and the fourth learning parameter (matrix $W^{I'}_A$, $W^{I'}_L$) to the second activation function (g( )) for calculation and output the calculation result to the subsequent layer.

Using the second neural network, the learning unit 261 adjusts the fourth learning parameter by the stochastic gradient descent method when the training data is given to the second input layer, outputs the hyperparameters from the output layer by giving the training data to the second input layer of the second neural network with the adjusted fourth leaning parameter, determines the structure of the first neural network by the hyperparameters, and adjusts the first learning parameter, the second learning parameter, and the third leaning parameter by the back propagation method, for example, when the training data is given to the first input layer of the first neural network with the determined structure. This makes it possible to automatically set the optimal hyperparameter that can suppress the overfitting.

The hyperparameter may be a hyperparameter that determines the pattern of elements constituting the first neural network. This way, it is possible to automatically set the pattern of the elements in the first neural network so as to suppress overfitting. Specifically, by determining the type of the first activation function, it is no longer necessary for a user to take into consideration which activation function needs to be used, and as a result, the neural network can be constructed with greater ease.

The hyperparameter may be a hyperparameter that determines the sequence of elements constituting the first neural network. This way, it is possible to automatically set the sequence of the elements in the first neural network so as to suppress overfitting. Specifically by determining the number of layers in the first intermediate layer, it is no longer necessary to take into consideration how many layers in the intermediate layer need to be increased or decreased, and as a result, the neural network can be constructed with greater ease.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A data analysis apparatus, comprising:
   a processor,
   a memory comprising instructions, when executed by the processor, cause the processor to
   use a first neural network that includes a first input layer, a first output layer, and a first intermediate layer having at least two layers between the first input layer and the first output layer, the first intermediate layer being configured to give data from a previous layer and a first adjustable learning parameter, wherein all learning parameters are adjustable weight vectors, to a first activation function for calculation and output a calculation result to a subsequent layer and;
   generate degenerated output data, which is data where the number of dimensions of each output data has been reduced, based on the calculation result from each of the first intermediate layer;
   receive output data from the first input layer and degenerated output data derived from each of the first intermediate layer, set a weight of each layer in the first intermediate layer based on the output data, the degenerated output data and a second adjustable learning parameter, and output said weight of each layer in the first intermediate layer to the first output layer;
   generate weighted output data by weighting the calculation result with the weight of each layer of the first intermediate layer based on the output data and the degenerated output data; and
   calculate prediction data based on each weighted output data and a third adjustable learning parameter;
   wherein the data analysis apparatus is configured to receive output data from each first intermediate layer, reduce the number of dimensions of each output data, and output each degenerated output data,
   wherein the data analysis apparatus receives each degenerated output data, sets a weight of each first intermediate layer based on said degenerated output data and the second learning parameter, and outputs the weight to the first output layer.

2. The data analysis apparatus according to claim 1, wherein the data analysis apparatus is further configured to:
   adjust the first learning parameter, the second learning parameter, and the third learning parameter using stochastic gradient decent when training data is given to the first input layer;
   receive output data from each first intermediate layer;
   generate degenerated output data by reducing the number of dimensions of each output data;
   set a weight of each first intermediate layer based on said degenerated output data and the second learning parameter;
   weight each second degenerated output data based on the weight of each first intermediate layer; and
   output the weight to the first output layer.

3. The data analysis apparatus according to claim 1, wherein the data analysis apparatus analyzes image, or text and/or numerical data.

4. The data analysis apparatus according to claim 1, wherein:
   the data analysis apparatus is further configured to adjust the first learning parameter, the second learning parameter, and the third learning parameter when training data is given to the first input layer.

5. The data analysis apparatus according to claim 4, wherein the data analysis apparatus is configured to:
   adjust the fourth learning parameter using a second neural network including a second input layer that receives the training data, a second output layer that outputs a hyperparameter of the first neural network, and a second intermediate layer interposed between the second input layer and the second output layer, the second intermediate layer being configured to give data from a previous layer and a fourth learning parameter to a second activation function for calculation and output a calculation result to a subsequent layer, when the training data is given to the second input layer;
   output the hyperparameter from the second output layer by giving the training data to the second input layer of the second neural network after the fourth learning parameter is adjusted;
   determine a structure of the first neural network based on the hyperparameter; and
   adjust the first learning parameter, the second learning parameter, and the third learning parameter when the training data is given to the first input layer of the first neural network after the structure thereof is determined.

6. The data analysis apparatus according to claim 1, further comprising:
   the data analysis apparatus is further configured to receive output data from each first intermediate layer, reduce the number of dimensions of each output data, and output each second degenerated output data,
   wherein the data analysis apparatus weights each second degenerated output data based on the weight of each first intermediate layer.

7. The data analysis apparatus according to claim 5, wherein the hyperparameter is to determine a pattern of elements constituting the first neural network.

8. The data analysis apparatus according to claim 7, wherein said hyperparameter that is to determine the pattern is a parameter indicating a type of the first activation function.

9. The data analysis apparatus according to claim 5, wherein the hyperparameter is to determine a sequence of elements constituting the first neural network.

10. The data analysis apparatus according to claim 9, wherein said hyperparameter that is to determine the sequence is a parameter indicating the number of layers in the first intermediate layer.

11. A data analysis method using a first neural network that includes a first input layer, a first output layer, and a first intermediate layer having at least two layers between the first input layer and the first output layer, the first intermediate layer being configured to give data from a previous layer and a first adjustable learning parameter, wherein all learning parameters are adjustable weight vectors, to a first activation function for calculation and output a calculation result to a subsequent layer,     wherein the data analysis method includes a processor and a storage device to store the first neural network, and wherein the processor is configured to conduct:

a degeneration process to generate degenerated output data, which is data where the number of dimensions of each output data has been reduced, based on the calculation result from each of the first intermediate layer;

a setting process to receive output data from the first input layer and degenerated output data derived from each of the first intermediate layer, set a weight of each layer in the first intermediate layer based on the output data, the degenerated output data and a second adjustable learning parameter, and output said weight of each layer in the first intermediate layer to the first output layer;

a weighting process to generate weighted output data by weighting the calculation result with the weight of each layer of the first intermediate layer that was set in the setting process; and     a calculation process to calculate prediction data based on each output data that was weighted in the weighting process and a third adjustable learning parameter;

wherein the data analysis method includes receiving output data from each first intermediate layer, reducing the number of dimensions of each output data, and outputting each degenerated output data,     wherein the data analysis method includes receiving each degenerated output data, setting a weight of each first intermediate layer based on said degenerated output data and the second learning parameter, and outputting the weight to the first output layer.

12. A non-transitory recording medium having stored thereon a data analysis program that causes a processor to conduct prescribed processes, the processor being able to access a storage device having stored therein a first neural network that includes a first input layer, a first output layer, and a first intermediate layer having at least two layers between the first input layer and the first output layer, the first intermediate layer being configured to give data from a previous layer and a first adjustable learning parameter, wherein all learning parameters are adjustable weight vectors, to a first activation function for calculation and output a calculation result to a subsequent layer, the non-transitory recording medium being readable by the processor,     the data analysis program causing the processor to execute:

a degeneration process to generate degenerated output data, which is data where the number of dimensions of each output data has been reduced, based on the calculation result from each of the first intermediate layer;

a setting processing for receiving output data from the first input layer and degenerated output data derived from each of the first intermediate layer, set a weight of each layer in the first intermediate layer based on the output data, the degenerated output data and a second adjustable learning parameter, and output the weight of each layer in the first intermediate layer to the first output layer;

a weighting processing for generating weighted output data by weighting the calculation result with the weight of each layer of the first intermediate layer that was set in the setting process; and     a calculation processing for calculating prediction data based on each output data that was weighted in the weighting process and a third adjustable learning parameter;

wherein the data analysis program is configured to receive output data from each first intermediate layer, reduce the number of dimensions of each output data, and output each degenerated output data,     wherein the data analysis program receives each degenerated output data, sets a weight of each first intermediate layer based on said degenerated output data and the second learning parameter, and outputs the weight to the first output layer.

\* \* \* \* \*